July 25, 1950

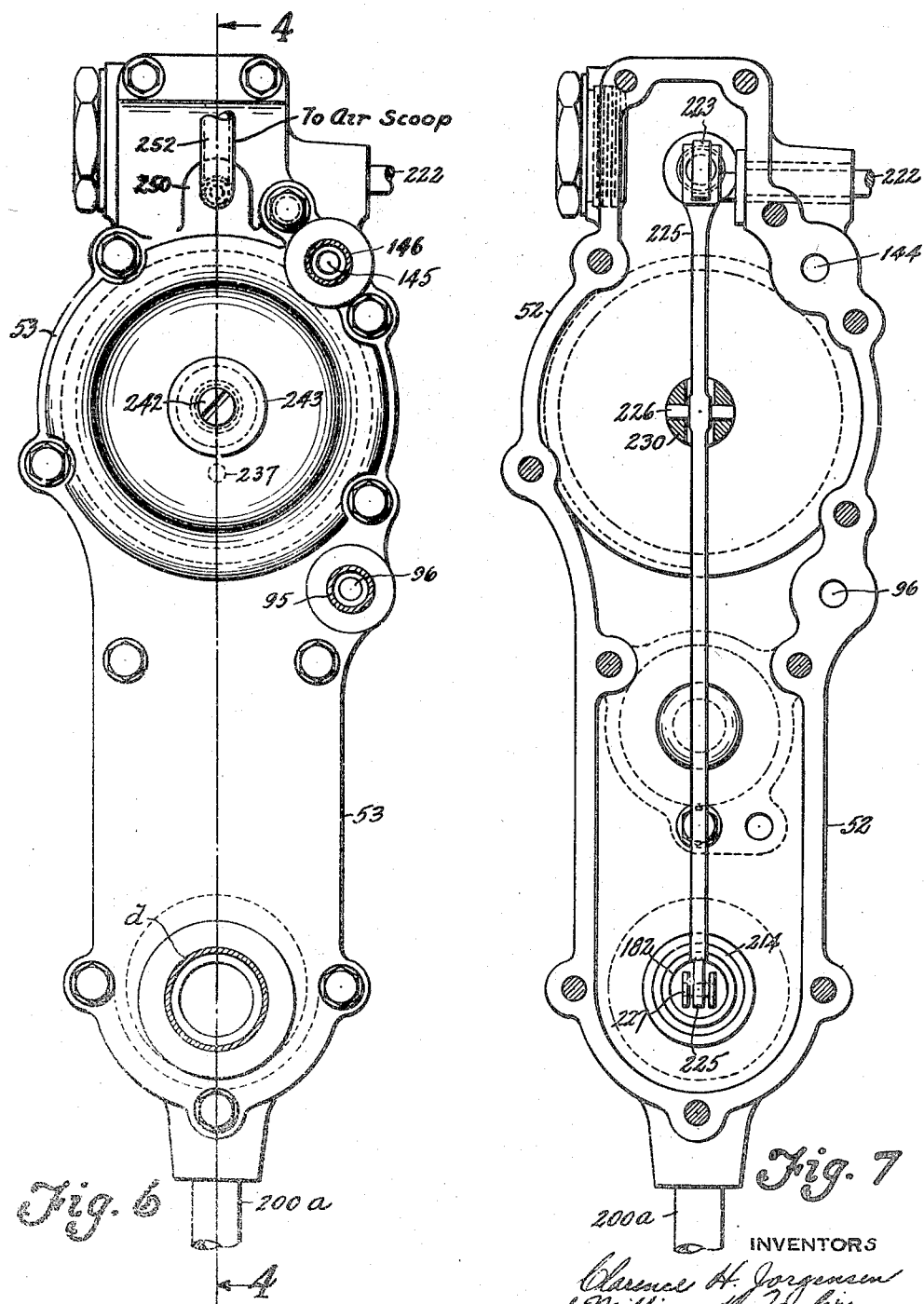

C. H. JORGENSEN ET AL 2,516,123

AIRPLANE ENGINE CONTROLLER

Filed April 10, 1944

INVENTOR
Clarence H. Jorgensen
and William H. Taylor
by Spencer, Hardwick & Fiske
their ATTORNEYS Patented July 25, 1950

2,516,123

UNITED STATES PATENT OFFICE 2,516,123

AIRPLANE ENGINE CONTROLLER

Clarence H. Jorgensen and William H. Taylor, Anderson, Ind., assignors to General Motors Corporation, Detroit, Mich., a corporation of Delaware Application April 10, 1944, Serial No. 530,280

10 Claims. (Cl. 123—103)

This invention relates to apparatus for controlling the pressure of the air or fuel mixture in the intake passage of an internal combustion engine supercharged by an engine driven supercharger and by an auxiliary supercharger having variable speed driving means.

It is an object of the present invention to provide a controlling unit for determining the position of a throttle valve in the air or fuel mixture intake of the engine and for determining the speed of the auxiliary supercharger. The unit provides manual control means for selecting a pressure to be maintained in the engine intake and means responsive to divergencies from a selected pressure for effecting thru the operation of a servo-motor that movement of the throttle which is required to maintain the selected pressure. The controller unit provides a second servo-motor for actuating an element for changing the speed of the auxiliary supercharger. This servo-motor is under control by the member which selects the pressure to be maintained and is under control by an aneroid whereby the speed of auxiliary supercharger can be increased as the pressure selection increases and also as the altitude increases. In the higher range of pressure selections, movement of the speed changing element is effected jointly by the second servo-motor and by the manually operated member which controls the pressure selection.

Further objects and advantages of the present invention will be apparent from the following description, reference being had to the accompanying drawings wherein a preferred embodiment of the present invention is clearly shown.

In the drawings:

Fig. 1 is in part a side elevation of the controller unit and in part a diagrammatic representation of the supercharging system of the engine.

Figs. 2 and 3 taken together constitute a full scale side elevation of the controller.

Figs. 4 and 5 taken together constitute a longitudinal sectional view taken principally on the line 4—4 of Fig. 6.

Fig. 6 is an end view looking in the direction of arrow 6 of Figs. 2 and 4.

Fig. 7 is a view on the plane of the line 7—7 of Fig. 2.

Figure 4:
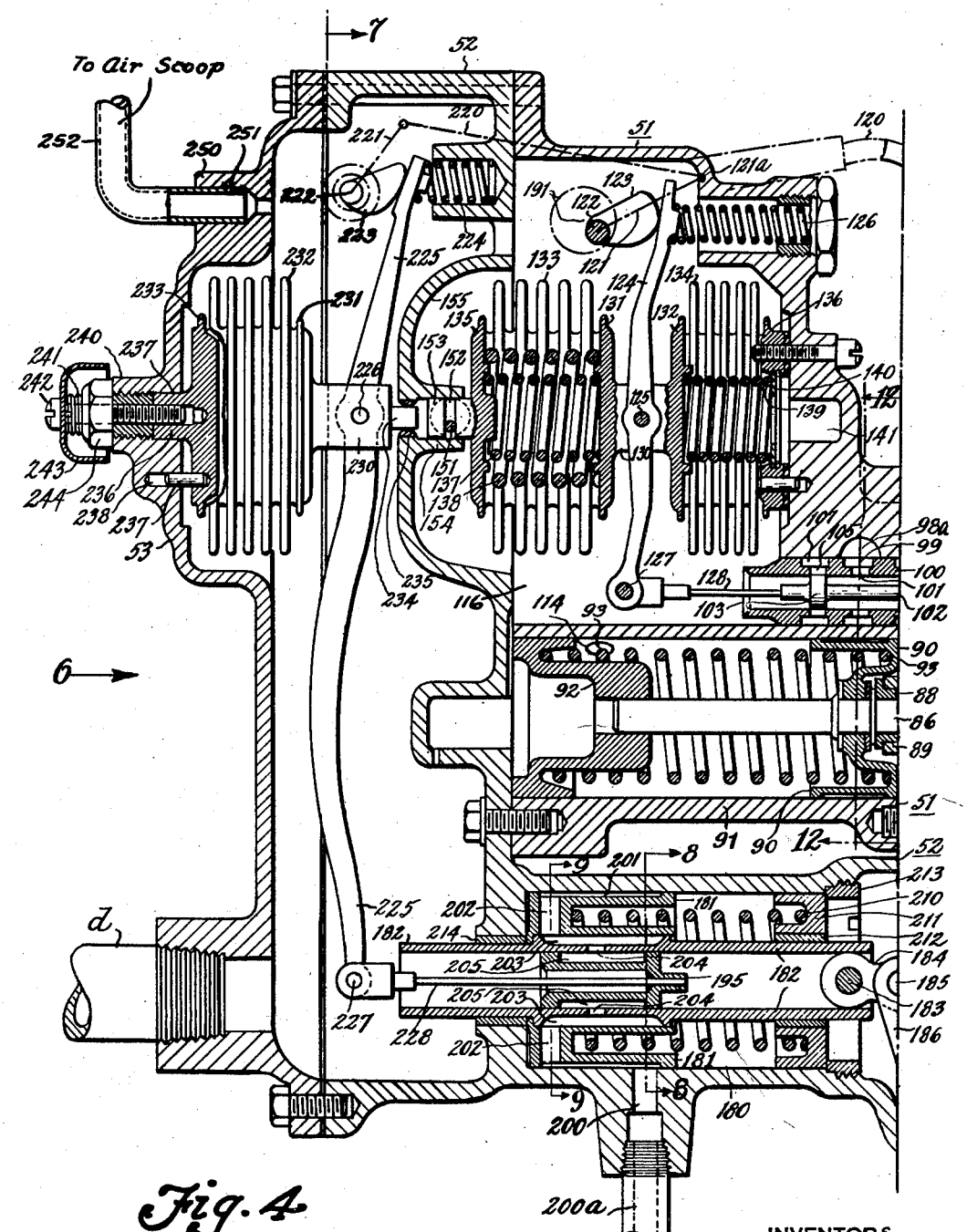
Figure 10:
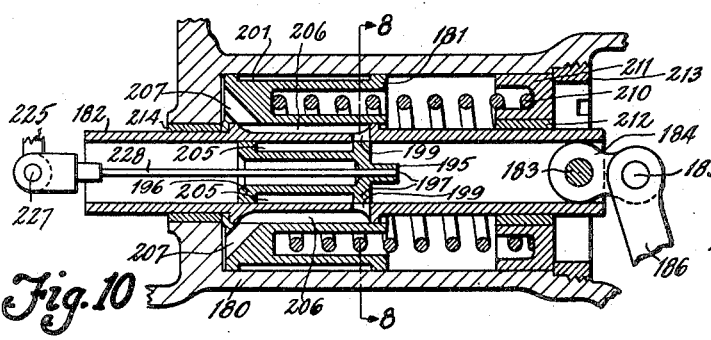
Figure 8:
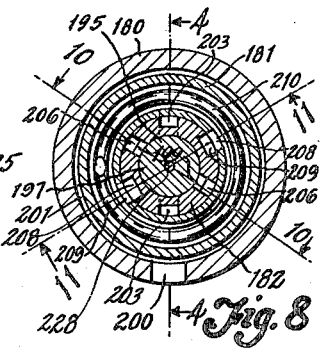
Fig. 8 is a sectional view on line 8—8 of Figs. 4 and 10.
Figure 11:
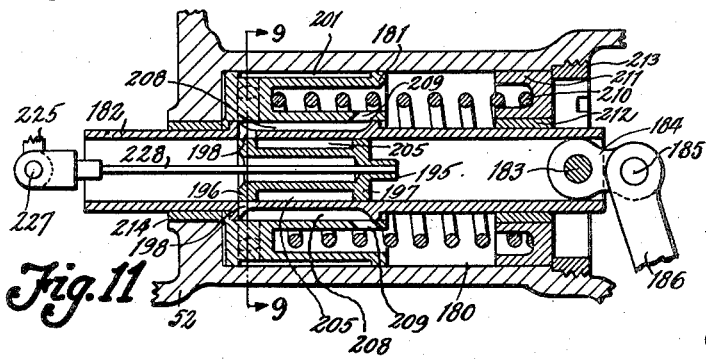
Figure 9:
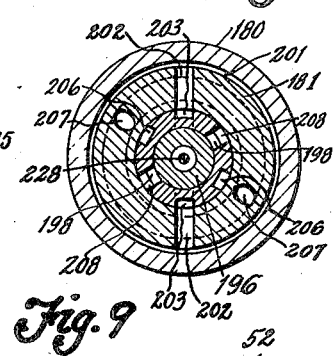
Fig. 9 is a sectional view on line 9—9 of Figs. 4 and 11.

Figs. 10 and 11 are respectively sectional views taken on the lines 10—10 and 11—11 of Fig. 8, whereas the lower portion of Fig. 4 is a sectional view on line 4—4 of Fig. 8.

Figure 12:
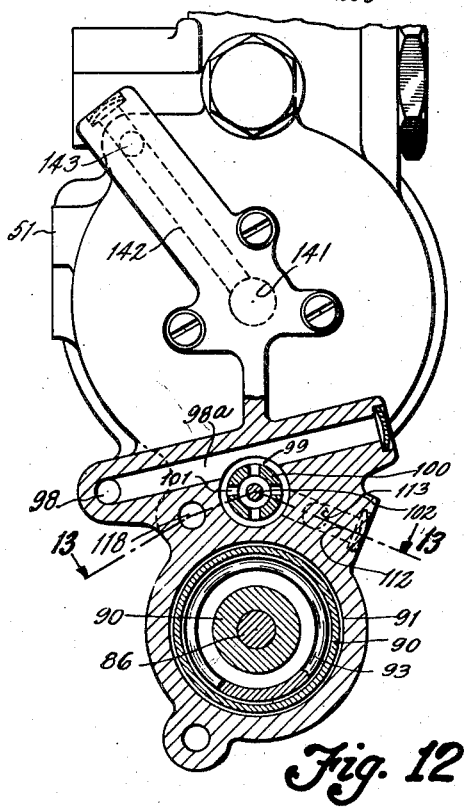

Fig. 12 is a sectional view on line 12—12 of Fig. 4.

Figure 13:
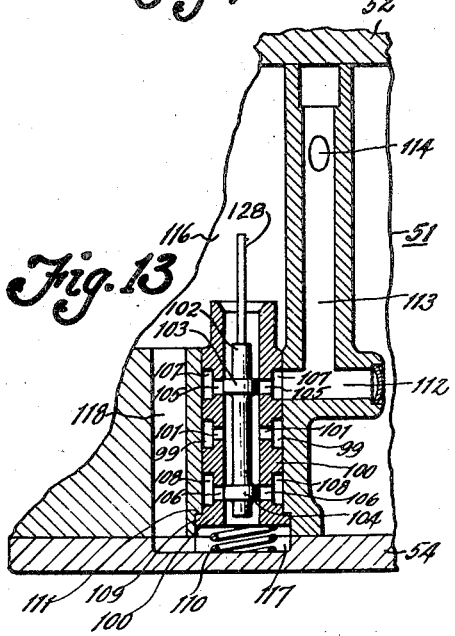

Fig. 13 is a sectional view on line 13—13 of Fig. 12.

Figure 1:
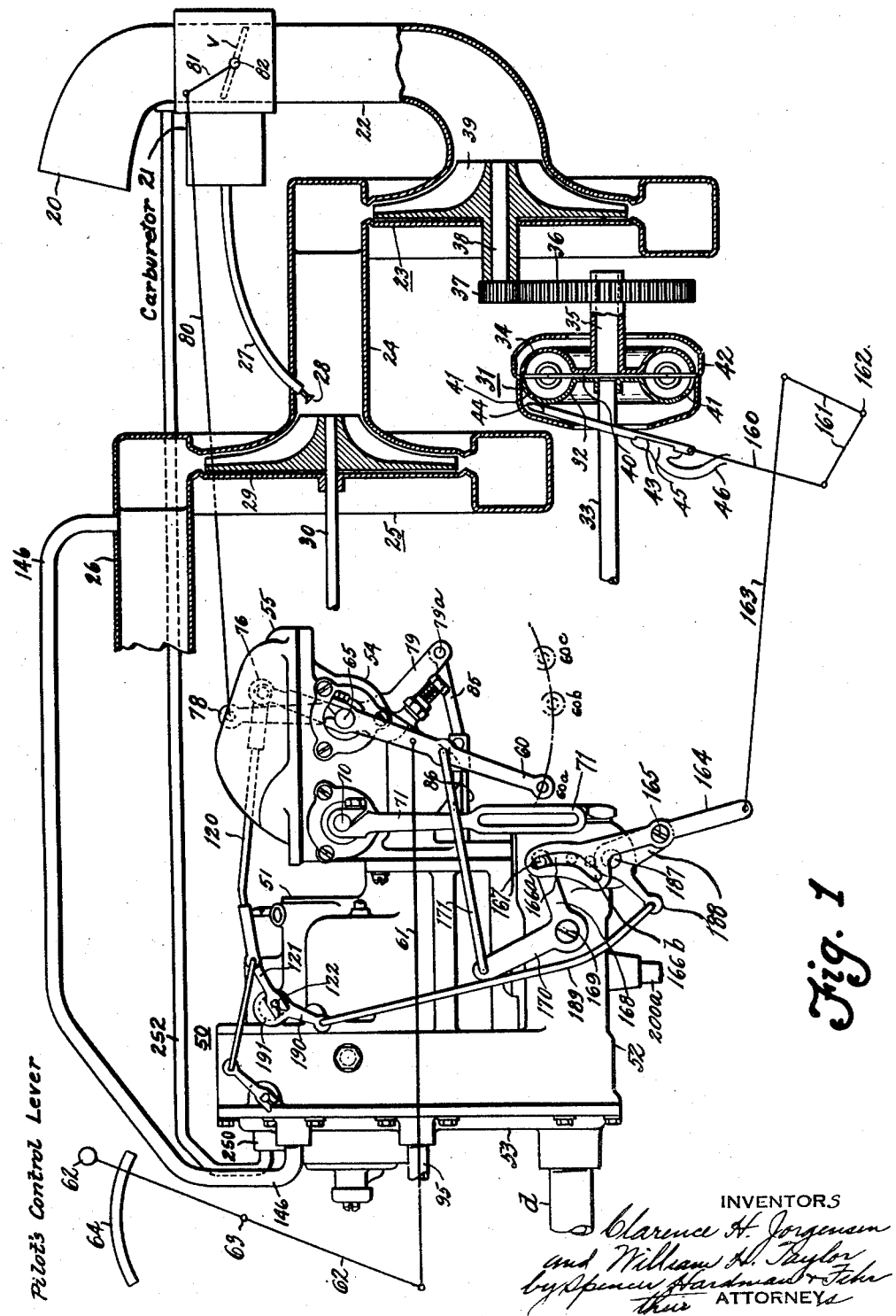

Referring to Fig. 1, the air or fuel mixture duct of the engine comprises an air scoop 20 connected with carburetor 21, pipe 22 connecting carburetor 21 with auxiliary supercharger 23 connected by pipe 24 with main supercharger 25 connected with engine intake 26. The air passing thru the carburetor is controlled by a throttle valve V. Metered fuel passes from the carburetor 21 thru a pipe 27 and terminating in a nozzle 28 adjacent the supercharged impeller 29 connected with an engine driven shaft 30.

The auxiliary supercharger 23 may be driven at variable speed in any suitable manner as by an exhaust turbine or by an infinitely variable speed drive such as a hydraulic coupling 31 which comprises a driving vane 32 connected with an engine driven shaft 33 and a driven vane 34 connected with a tubular shaft 35 connected by gears 36 and 37 with a shaft 38 which drives the impeller 39 of the auxiliary supercharger. The hydraulic fluid or oil which provides the medium for transmitting motion from the vane 32 to the vane 34 is conducted thru the tubular shaft 35 and thru the narrow space 40 to the vane members. The oil receiving chamber within the vane members is connected by holes 41 with the interior of a housing 42 attached to the vane member 32. The rotary liquid level within the housing 42 is the same as within the vane members 32 and 34. The coupling ratio between the shafts 33 and 35 is determined by the distance between the axis of these shafts and the rotary liquid level which is determined by the position of a tube 43 opening at 44 into the body of coupling fluid and opening at 45 into a drain member 46 from which oil is passed by means of a scavenger pump (not shown) to an oil tank from which oil is forced under pressure to the shaft 35. The tube 43 operates to scoop the oil from the housing 42 and therefore will be termed hereafter the "coupling scoop." It is apparent that the coupling slip is greatest and the speed of the supercharger 23 least when the opening 44 of the scoop is furthest from the axis of shaft 33 and that, as the scoop is moved down in Fig. 1 to bring the end 44 nearer to the shaft 33, the coupling slippage decreases and the speed of the supercharger 23 increases.

The control unit which constitutes an embodiment of the present invention is designated in its entirety by numeral 50. The controller 50 comprises a housing member 51 which encloses a servo-motor for operating the valve V, a housing member 52 which encloses a servo-motor for operating the coupling scoop 43, a back plate or cover 53, a cam housing 54 and a cam housing cover 55. These parts are secured together in any suitable manner.

Figure 3:
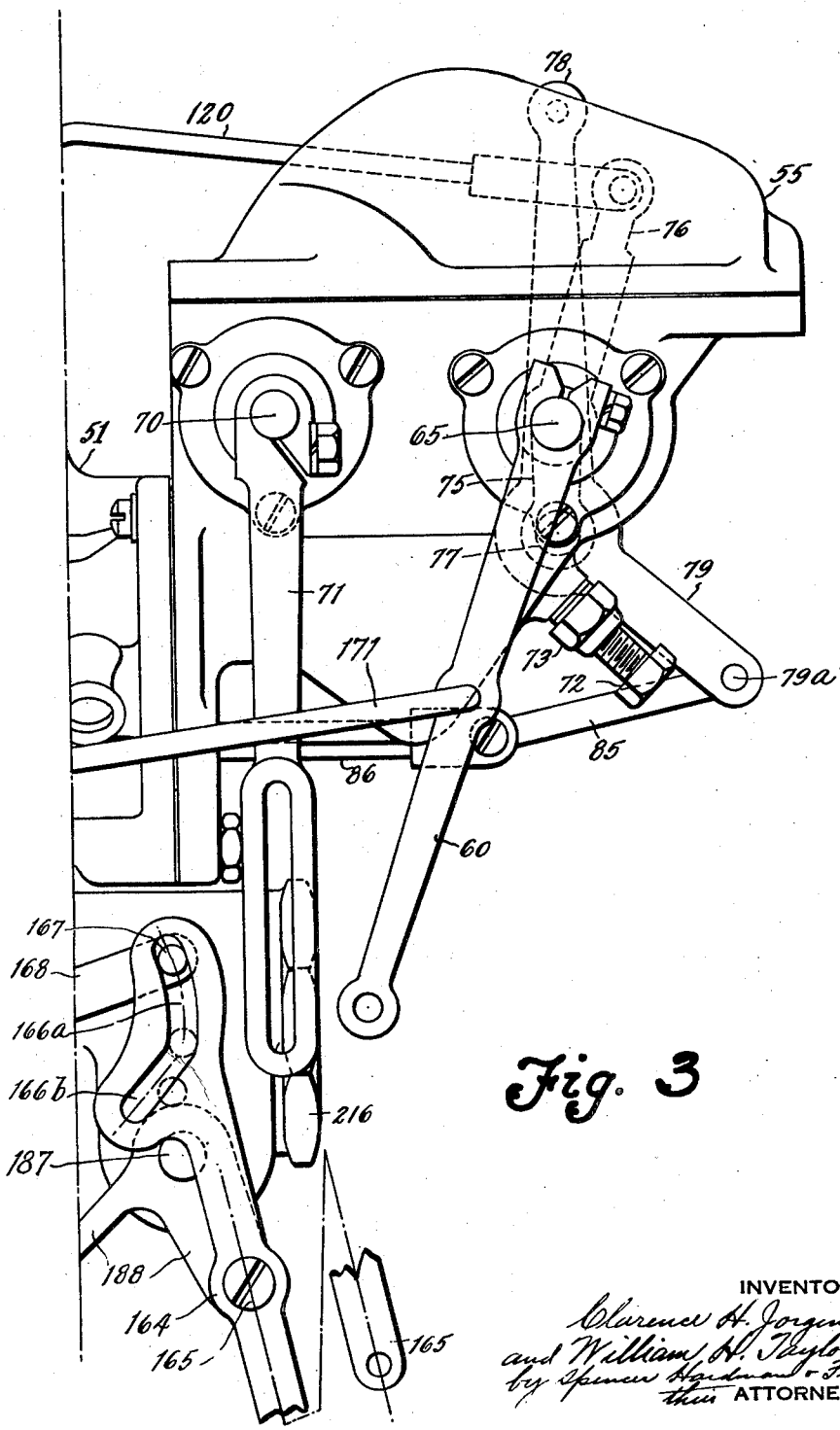

Referring to Figs. 1 and 3, 60 designates the main control lever connected as shown diagrammatically in Fig. 1 by link 61 with the pilot's control lever 62 which is pivoted at 63 and which can be frictionally retained in engagement with a sector 64 by any suitable means not shown. Lever 60 is attached to shaft 65 which is pivotally supported by the housing 54 and which is connected with a cam 66 (Fig. 5) having a slot or race 67 receiving a roller 68 connected with a lever 69 connected with a shaft 70 which is also pivotally supported by the housing 54. Shaft 70 is connected with a lever 71 for making connection with a mechanism (not shown) which controls the governed speed of the engine. Therefore, the speed of the engine can be controlled by the pilot's control lever 62. Counterclockwise rotation of cam 66 into the passage 66a is limited by engagement of the cam with a stop screw 72 locked in adjusted position by a nut 73.

The shaft 65 is connected with a short lever 75 (Figs. 3 and 5) and a longer lever 76. Lever 75 carries stud 77 providing a fulcrum for a bell crank lever having arms 78 and 79. Arm 78 is connected by link 80 (Fig. 1) with a lever 81 attached to a shaft 82 which carries the throttle valve V. Lever 79 is connected by link 85 with servo-motor piston rod 86 which extends thru a packing member 87 and a bushing 88 and a cylinder head member 89 and is connected with a piston 90 movable within a cylinder 91 as illustrated in Fig. 4. Rod 86 is guided by cylinder head member 92. In the left end of cylinder 91 a spring 93, located between the head 92 and the piston 90, urges the piston toward the right in Fig. 4. This servo-motor is operated by pressure fluid entering through a pipe 95 (Fig. 2) connected with hole 96 in plate 53, with hole 97 in housing 52, with hole 98 in housing 51 which is connected with passage 98a (Fig. 12). Passage 98a is connected with a groove 99 in a valve guide 100 having a plurality of ports 101 leading to the interior or central bore of the guide. A valve 102 having lands 103 and 104 (Figs. 4 and 5) controls the distribution of the pressure of oil to ports 105 and 106 which are connected with grooves 107 and 108 respectively provided by the guide 100, which is provided with a flange 109 (Fig. 5) which is urged by a spring washer 110 against a shoulder 111 provided by the housing 51. As shown in Fig. 13 the ports 105 are connected by the groove 107 with passages 112 and 113 and a passage 114 with the left end of the cylinder 91. The end of the passage 114 appears in Fig. 4. The groove 108 is connected by a passage 115 (Fig. 5) with the right end of the cylinder 91. When valve 102 moves right to connect the ports 101 with the ports 106 the piston 90 will move left and oil in the left end of the piston will be discharged through passages 114, 113, 112, ports 105 and out through the central bore of the guide 100 into a chamber 116 (Fig. 4) provided by the housing 51. When the valve 102 moves left to connect the ports 101 and 105 the piston 90 will move right and oil in the right end of the cylinder will be discharged through passage 115 and ports 106 into the central bore of guide 100 and out through the passages 117 and 118 (Fig. 13) and into the chamber 116 from which it returns to the engine oil system.

The valve 102 is positioned jointly by manually operated means for selecting a pressure to be maintained and by a device responsive to engine intake pressure. For this purpose the lever 76, which is moved by the pilot's control lever through the main control lever 60 of the regulator, is connected by a link 120 with a lever 121 connected with a shaft 122 which, as shown in Fig. 4, carries a pressure selecting cam 123 which cooperates with a lever 124 pivoted at 125 and urged by a spring 126 against the cam 123. The lower end of lever 124 is connected by a pin 127 and a link 128 with the valve 102. The pivot 125 is supported by a bridge 130 connecting the movable end plates 131 and 132 of bellows 133 and 134, respectively, having relatively fixed end plates 135 and 136. Between the plates 131 and 135 of bellows 133, springs 137 and 138 are confined under compression; and between plates 132 and 136 of bellows 134, a spring 139 is confined. These springs are so calibrated that the pivot 125 will move in a definite and substantial linear relation with respect to changes in the pressure within the bellows 134. The bellows 133 and 134 have substantially the same external area so that bellows 133, which is evacuated, compensates for variations in atmospheric pressure affecting the bellows 134. Therefore, the bellows system responds only to variations in pressure within the bellows 134 which is connected with the engine intake manifold through a hole in a plate 140 (attached to the plate 136), passage 141, passage 142 (Fig. 2) and passage 143 in housing 51, passage 144 in housing 52 and passage 145 in cover 53 and a pipe 146 (Fig. 1) connecting the hole in cover 53 with the intake manifold 26.

Figure 2:
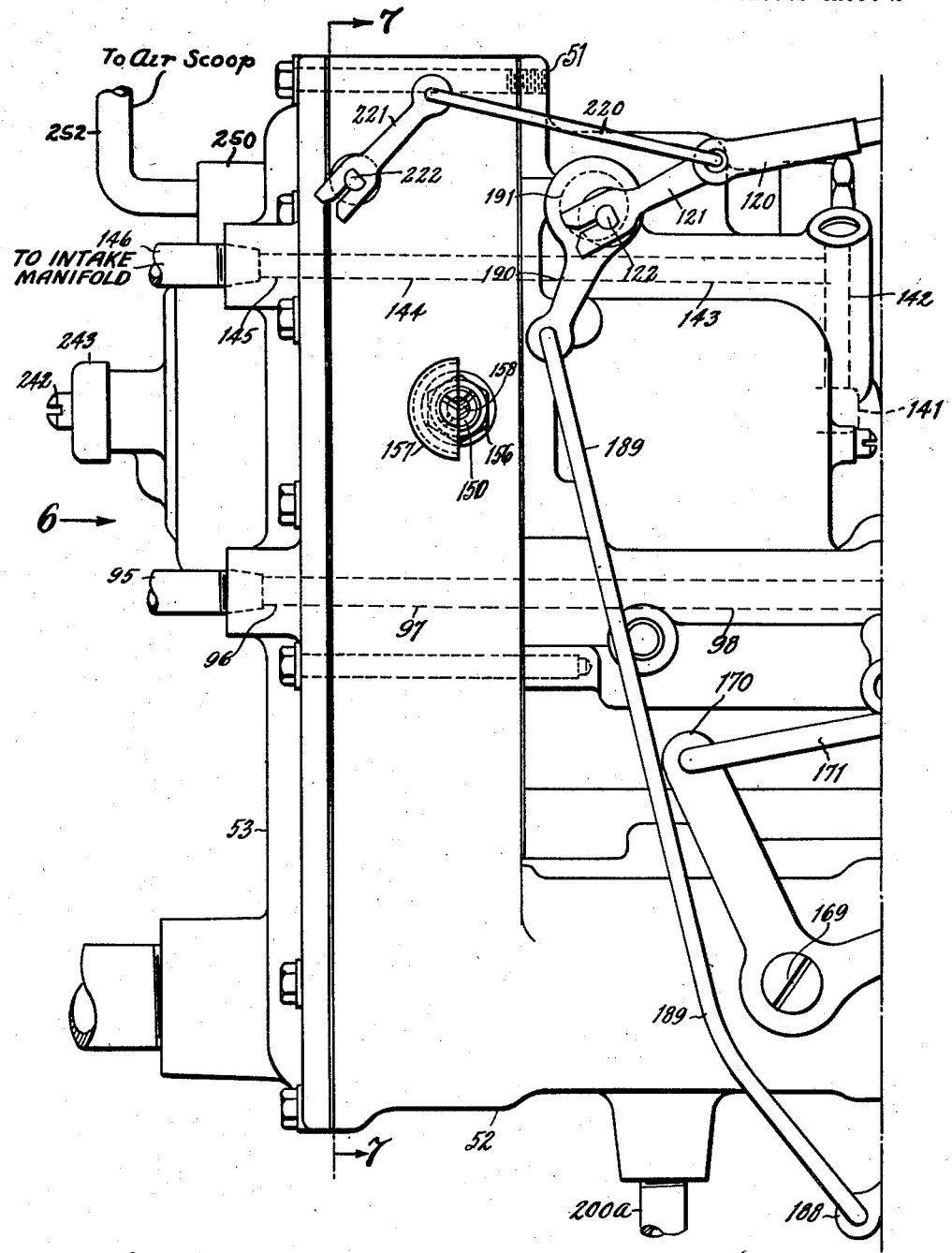

The bellows system is initially adjusted by turning a screw 150 (Fig. 2) carrying an eccentric pin 151 (Fig. 4) received by groove 152 provided by the cylindrical extension 153 of the bellows plate 135 which is slidable in a boss 154 provided by wall 155 of the housing 52. The screw 150 is secured in adjusted position by lock nut 156 (Fig. 2). The lock nut is protected by a cover 157 attached to screw 150 by a screw 158.

Figure 5:
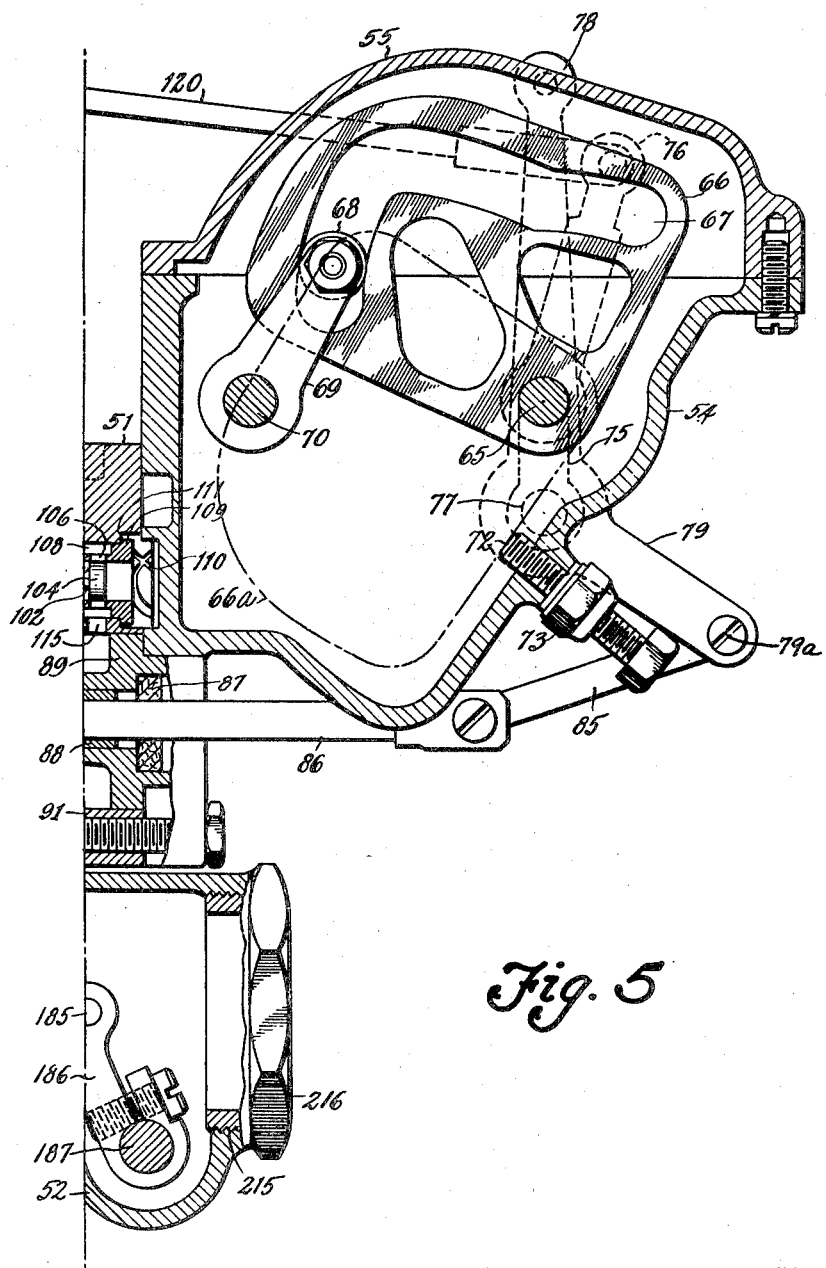

Fig. 4 shows the pressure selecting cam 123 in its position for selecting the lowest pressure for engine idling. When the pilot wishes to take off he moves the lever 62 counterclockwise thereby effecting counterclockwise movement of levers 60, shaft 65, lever 76, lever 121, shaft 122 and cam 123. As the pivot 77 carried by lever 75 moves toward the right in Fig. 1 the bell crank lever arm 79, being pivotally connected at 79a with link 85, will be caused to rotate around its pivotal connection 79a; and the bell crank as a whole will rotate clockwise about the pivot 77 thereby causing the link 80 to move toward the right and the valve V to open to some position which will cause the intake pressure to rise to a value somewhat less than the pressure selected by movement of cam 123. As the cam 123 is caused to move counterclockwise in the manner described, the lever 124 will rotate counterclockwise and the valve 102 will move to the right to connect the pressure fluid with the right end of the cylinder thereby causing the piston 90 to move left to increase the opening of the throttle in order that the pressure will be raised to the selected value. As the pressure increases the bellows 134 expands to cause the pivot 125 to move left to effect a closing movement of the valve 102 in order to bring it into a position of equilibrium, as shown in Figs. 4 and 5. As the altitude increases the servo-motor continues to open the valve V in order to maintain the selected pressure. At a certain altitude the valve V will have been moved as wide open as possible through the joint operation of the manual and automatic controls. After that altitude is exceeded, the intake pressure will begin to decrease; hence, that altitude is called the "critical altitude" for the pressure which has been selected. As the altitude decreases the pressure in bellows 134 increases and effects a movement of valve 102 to the left in order to effect, through the operation of the servo-motor, a closing movement of the throttle valve V in order to reduce the intake pressure to the selected value. Thus the controller provides means under the joint control of a pressure selecting device and of means responsive to engine intake pressure for effecting through a servo-motor the positioning of the throttle valve in such manner as to correct for any divergency of intake pressure from the selected or standard pressure.

The supercharger 25, which is directly driven by the engine and is therefore known as the "engine stage supercharger," operates to provide the required supercharging for idling and part-load operation of the engine. At the same time the auxiliary supercharger 23 is being driven by the engine through the shaft 33 and hydraulic coupling 31 at a speed such that no drag is placed on the engine supercharger 25. Therefore, the normal position of the coupling scoop 43 is such that the minimum slip of the coupling provides a speed of the supercharger 23 sufficient to overcome the friction of the movement of air to the supercharger 25. In fact there may be a slight boost of the supercharger 25 by the supercharger 23 under part-load conditions.

When the engine is required to operate for take-off or emergency, or even under cruising conditions, it is necessary to operate the auxiliary supercharger 23 at an increased speed in order that it will provide the boost necessary to maintain the required pressure up to high altitude. For this purpose coupling scoop 43 is placed under the joint control directly by the main control lever 60 and by a servo-motor the operation of which is under joint control by the main control lever 60 and by an aneroid. As shown in Fig. 1, coupling scoop 43 is connected by link 160 with a bell crank lever 161 pivoted at 162 and connected by link 163 with lever 164, pivoted at 165 and provided with a cam slot having parts 166a and 166b, both for receiving a pin 167 on arm 168, pivoted at 169 on housing 52 and integral with an arm 170 connected by a link 171 with lever 60. The portion 166a of the cam slot is arcuate, having its center of curvature at the center of pivot 169. Therefore, during certain movements of lever 60 as from 60a to 60b (Fig. 1) for selecting pressures in the lower range, there is no movement of lever 164 directly by the lever 60. However, during movement of lever 60 in the higher pressure range the pin 167 cooperates with the oblique portion cam slot portion 166b to effect clockwise movement of the lever 164 as lever 60 moves from 60b to 60c when selecting higher pressures.

The servo-motor for controlling the hydraulic coupling comprises a cylinder 180 integral with the housing 52 cooperating with a piston 181 which is attached to a tube 182 connected by a pin 183, a link 184 and a pin 185 with a lever 186 fixed to a shaft 187 (Fig. 5), fastened to a bell crank lever 188 (Fig. 1) which carries the pivot 165 for lever 164 and which is connected by a link 189 with a lever 190 attached to a shaft 191 (Fig. 2) which eccentrically supports the shaft 122 of the pressure selecting cam 123 (Fig. 4). The position of the piston 181 is controlled by a valve 195 having lands 196 and 197 respectively for controlling ports 198 (Fig. 11) and 199 (Fig. 10) provided by the tube 182. The servo-motor is operated by oil under pressure which enters a passage 200 connected with an oil pressure pipe 200a (Fig. 4). Passage 200 is in communication with a groove 201 of piston 181 in any position thereof. The groove 201 is connected by radial passages 202 of the piston with diametrically opposite slots 203 of the tube 182 (Fig. 4) and these slots are connected by holes 204 with the annular groove 205 between the lands of the valve 195. In any equilibrium position of the piston the ports 198 and 199 are closed by the valve lands 196 and 197 respectively. If the valve 195 moves to the right of its position shown in Fig. 10 then the groove 205 receiving oil under pressure is connected by the ports 199 with two diametrically opposite grooves 206 of the tube 182 which are connected by passages 207 with the left end of the cylinder 180. Therefore the piston 181 will move right to a position such that the ports 199 are closed by the lands 197, and movement of the piston right will cease. If valve 195 is moved left from the position shown in Fig. 11, groove 205 will be connected by ports 198 with diametrically opposite grooves 208 of the tube 182 which are connected by holes 209 with the right end of the cylinder 180. Therefore, the piston 181 will be urged toward the left and will so move when there is clearance between the piston and the left end wall of the cylinder. This movement will continue until the ports 198 become closed by the land 196. Therefore, under oil pressure, the piston will follow the valve. The position of the valve determines the position of the piston and of the coupling scoop 43 (Fig. 1). In case of failure of the oil pressure, the coupling scoop is returned to position of greatest slip or lowest gear ratio by a spring 210 located between the piston 181 and a cylinder head member 211 providing a bearing 212 for the tube 182. The head 211 is retained by a tubular plug 213. The left end of the rod 182 is guided by a bushing 214 provided by the housing 52. To permit assembling the pin and valve within the cylinder the housing 52 is provided with a threaded opening 215 closed by a plug 216 (Fig. 5). A drain conduit d is illustrated, through which oil from the housing 52 is returned to the source of supply.

The location of the valve 195 is determined jointly by altitude responsive means and by means controlled by the main control lever and operated in coordination with movements of the selector cam 23. For this purpose the selector cam operating lever 121 is connected by a link 220 with an arm 221 attached to a shaft 222 carrying a cam 223 against which a spring 224 urges lever 225 having a floating fulcrum pin 226 and connected at its lower end by a pin 227 and by a wire link 228 with the valve 195. The floating fulcrum pin 226 is supported by a member 230 integral with the right plate 231 of an aneroid bellows 232 having a left plate 233 which can be secured in a desired position of adjustment. The right end of the member 230 carries an extension 234 slidable in a bearing 235 provided by the wall 188 of housing 52. A boss 236 extending from the plate 233 is slidably supported at 237 by the cover plate 53. Rotation of the plate 233 is prevented by a dowel pin 237 fixed to the plate 233 and slidable thru a recess 238 in the cover 233. For the purpose of adjusting the plate 233 and the position of the lever 225, a boss 240 provided by the cover plate 53 threadedly receives a screw 241 thru which extends a screw 242 which is threadedly attached to the member to 236. The screw 242 is removed thereby permitting removal of a guard 243. Then the screw 241 is turned to the desired position and it is secured by a self-locking nut 244. Then the cap 243 and the screw 242 are replaced, the screw being turned so as to draw the part 236 against the right end of the screw 241.

The function of the cam 223 is to determine the initial position of the coupling scroop 43. As a higher pressure is selected as a result of counterclockwise rotation of cam 123 there will be a corresponding rotation of cam 223 and a counterclockwise rotation of the lever 225 and the movement of the valve 195 toward the right. This causes the coupling scoop to be moved from its position of greater slip, to a position of lesser slip thereby providing a coupling ratio which is suitable for that selected pressure at ground level. As altitude increases the aneroid 232 will expand and cause floating pin 226 to move toward the right thereby causing movements of the valve 195 to the right in accordance with altitude increase. The cam 223 and the aneroid bellows 232 are so constructed and calibrated as to effect thru the hydraulic coupling an increase of the speed of the supercharger 23 in a manner such that the supercharger will operate at maximum speed at the required high altitude. Obviously the calibration must be such that the pressure obtained at that high altitude must be below the borderline detonating pressure. In other words, the maximum movement of the piston toward the right must be no more than that required to cause the pressure to be within safe limits.

For certain high pressure selections, such as for take off and emergency, it is necessary to start with the coupling scoop end 44 much nearer to the shaft 33 than it would be when controlled solely by the cam 233 and the aneroid 232. Therefore the coupling scoop is placed under the joint control of the lever 60 and the lower servo-motor. For positions of the lever 60 between 60a and 60b (Fig. 1), no movement of the lever 164 takes place, since the pin 167 moves through the radial portion 166a of the slot. Between positions of 60b and 60c of the lever 60 the pin 167 engages the inclined or oblique portion 166b of lever 164 thereby causing it to move clockwise to cause movement of the coupling scoop end 44 toward the shaft 33. Therefore the ground level coupling ratio of the hydraulic coupling is increased from the minimum when the pressure selection is for "take-off" or higher.

In response to operation of the lower servo-motor, when increasing the coupling ratio, the selected pressure is raised to cause the engine to develop the additional power required to drive the supercharger 23 at higher speed. This is accomplished by effecting clockwise rotation of shaft 191 which eccentrically supports selector cam shaft 122 through the mechanism which includes the lever 188 (Fig. 1) rotated clockwise by movement of piston 181 toward the right (Fig. 4), link 189 and lever 190.

In order to maintain in the space within the main housing member 52 the same pressure as is maintained in the air scoop or carburetor intake, a boss 250 is formed on the outer surface of the plate or cover member 53 and is provided with a threaded opening 251 extending therethrough and communicating with the space inside the housing. A pipe 252 is adapted to be screwed into this threaded passage and extends as shown in Fig. 1 to the air scoop 20 which admits air to the carburetor. This pipe connects with the air scoop at a point anterior to the carburetor and communicates what ever pressure is maintained in the scoop at this point to the space within the housing member 52. Leading from this housing 52, at the lower portion thereof, is an oil pipe d.

While the embodiment of the present invention as herein disclosed, constitutes a preferred form, it is to be understood that other forms might be adopted, all coming within the scope of the claims which follow.

What is claimed is as follows:

1. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, an aneroid, means under control by the manually operated member and by the aneroid for controlling the second servo-motor and means operated by the second servo-motor for modifying the status of the pressure selecting means to increase the selected pressure as the speed of the auxiliary supercharger is increased.

2. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, an aneroid, means under control by the manually operated member and by the aneroid for controlling the second servo-motor and means under joint control by the second servo-motor and by the manually operated member for actuating the speed-controlling member.

3. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, an aneroid, means under control by the manually operated member and by the aneroid for controlling the second servo-motor, means operated by the second servo-motor for modifying the status of the pressure selecting means to increase the selected pressure as the speed of the auxiliary supercharger is increased and means under joint control by the second servo-motor and by the manually operated member for actuating the speed-controlling member.

4. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, said servo-motor comprising a cylinder and a piston mounted on a tubular piston rod, ports provided by the rod for controlling the flow of pressure fluid to either side of the piston, a control valve slidable within the rod for controlling said ports, an aneroid, and means under control by the manually operated member and by the aneroid for determining the position of the control valve.

5. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, said servo-motor comprising a cylinder and a piston mounted on a tubular piston rod, ports provided by the rod for controlling the flow of pressure fluid to either side of the piston, a control valve slidable within the rod for controlling said ports, a floating lever connected with the valve, an aneroid for positioning the lever, and a cam operated by the manually operated means in coordination with the operation of the pressure selecting means for positioning the lever.

6. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, an aneroid, means under control by the manually operated member and by the aneroid for controlling the second servo-motor and a mechanism for moving the variable speed controlling member and including a floating lever, means for transmitting motion from the second servo-motor to the lever, and means responding to movement of the manually operated member when selecting certain pressures for imparting movement to the lever.

7. Apparatus for controlling the intake pressure of an airplane engine having a main supercharger and an auxiliary supercharger, variable speed means for driving the auxiliary supercharger, a member for controlling the variable speed driving means, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for moving the speed-controlling member, means for determining the initial position of the speed-controlling member in response to movement of the manually operated member to select certain pressures, means controlled by altitude and by the manually operated member for determining the extent of movement of the speed controlling member by the second servo-motor, means operated by the second servo-motor for modifying the status of the pressure selecting means to increase the selected pressure as the speed of the auxiliary supercharge is increased.

8. Apparatus for controlling the intake pressure of an airplane engine having a main supercharger and an auxiliary supercharger, means for driving the auxiliary supercharger, a variable speed coupling device between the driving means and the supercharger, a member for adjusting the coupling to cause the supercharger to be driven at progressively varying speeds, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for operating said member to vary the speed at which the supercharger is operated by its driving means, an aneroid, and means under control of the aneroid and said manually operated member for controlling the operation of said second servo-motor.

9. Apparatus for controlling the intake pressure of an airplane engine having a main supercharger and an auxiliary supercharger, means for driving the auxiliary supercharger, a variable speed coupling device between the driving means and the supercharger, a member for adjusting the coupling to cause the supercharger to be driven at progressively varying speeds, a throttle valve for controlling intake pressure, a manually operated member, means operated thereby for moving the throttle valve and for selecting a pressure to be maintained, a servo-motor for moving the throttle valve, means responsive to the pressure selecting means and to engine intake pressure for controlling the servo-motor in order to position the throttle valve for maintaining the selected pressure, a second servo-motor for operating the member for controlling the action of said coupling, means for determining the initial position of said member in response to movement of the manually operable member to select some desired pressure, and means controlled by altitude and by the manually operable member for determining the extent of movement of the member which controls the action of said variable speed coupling.

10. Apparatus for controlling the intake pressure of an aircraft engine having main and auxiliary superchargers, means for driving the auxiliary supercharger, a variable speed coupling device between the driving means and the auxiliary supercharger, a member for adjusting the coupling to cause the supercharger to be driven at progressively varying speeds, a throttle valve for controlling intake pressure, a manually operated member, means operated thereby for moving the throttle valve and for selecting a pressure to be maintained, a hydraulic servo-motor for moving said valve, a pressure selecting cam positioned by the manually operated member, a device responsive to engine intake pressure, a valve for controlling the servo-motor and under joint control by the cam and the pressure responsive device whereby the servo-motor positions the throttle valve to maintain the selected pressure, a second servo-motor for positioning the adjusting member of the variable speed coupling device, an aneroid, a second cam coordinated with the first cam and positioned by the manually operated member, and means under joint control by the second cam and by the aneroid for controlling the action of the second servo-motor.

CLARENCE H. JORGENSEN.
WILLIAM H. TAYLOR.

REFERENCES CITED

The following references are of record in the file of this patent:

UNITED STATES PATENTS

| Number | Name | Date |
| --- | --- | --- |
| 2,018,914 | Endres | Oct. 29, 1935 |
| 2,217,364 | Halford | Oct. 8, 1940 |
| 2,290,884 | Kollmann | July 28, 1942 |
| 2,297,235 | Muller | Sept. 29, 1942 |
| 2,336,844 | Buck | Dec. 14, 1943 |
| 2,355,759 | Stokes | Aug. 15, 1944 |

FOREIGN PATENTS

| Number | Country | Date |
| --- | --- | --- |
| 454,154 | Britain | Sept. 21, 1936 |